United States Patent [19]

Onishi et al.

[11] Patent Number: 4,746,435

[45] Date of Patent: May 24, 1988

[54] BIOCHEMICAL PROCESS FOR PURIFYING CONTAMINATED WATER

[75] Inventors: Hisao Onishi, Hiroshima; Ryozo Numazawa, Otake, both of Japan

[73] Assignee: Mitsubishi Rayon Co., Ltd., Tokyo, Japan

[21] Appl. No.: 470,138

[22] Filed: Feb. 28, 1983

Related U.S. Application Data

[63] Continuation of Ser. No. 308,884, Oct. 5, 1981, abandoned.

[30] Foreign Application Priority Data

Oct. 13, 1980 [JP] Japan ................................ 55-142801

[51] Int. Cl.$^4$ .............................................. C02F 3/04
[52] U.S. Cl. .................................... 210/615; 435/182; 210/150; 210/903; 210/500.23
[58] Field of Search ............... 210/615, 620, 150, 151, 210/621–623, 626–628, 500.2, 630, 903; 435/182

[56] References Cited

U.S. PATENT DOCUMENTS

| 4,167,479 | 9/1979 | Besik | 210/903 |
| 4,181,604 | 1/1980 | Onishi et al. | 210/622 |

FOREIGN PATENT DOCUMENTS

| 51-90164 | 8/1976 | Japan | 210/903 |
| 54-21057 | 2/1979 | Japan | 210/615 |
| 54-135448 | 10/1979 | Japan | 210/903 |
| 1342757 | 1/1974 | United Kingdom . | |
| 1402369 | 8/1975 | United Kingdom . | |
| 1408600 | 10/1975 | United Kingdom . | |

Primary Examiner—Benoit Castel
Attorney, Agent, or Firm—Ladas & Parry

[57] ABSTRACT

A process for treating contaminated water containing BOD sources and nitrogen sources, which comprises supplying oxygen or oxygen-containing gas from one side of a gas-permeable membrane to grow microorganisms including aerobic bacteria and anaerobic bacteria on the other side of the gas-permeable membrane, and performing decomposition of the BOD sources and nitrification and denitrification simultaneously by the action of these microorganisms. Especially good results are obtained when a membrane composed of porous hollow fibers is used as the gas-permeable membrane.

5 Claims, No Drawings

BIOCHEMICAL PROCESS FOR PURIFYING CONTAMINATED WATER

This is a continuation of copending application Ser. No. 308,884 filed Oct. 5, 1981, now abandoned.

BACKGROUND OF THE INVENTION

1. Field of the Invention

The present invention relates to a process for biochemically purifying contaminated water containing BOD (Biochemical Oxygen Demand) sources and nitrogen sources. More particularly, the present invention relates to a process for purifying contaminated water by microorganisms which decompose BOD sources and nitrogen sources in the contaminated water.

2. Description of the Prior Art

According to conventional biochemical treatment of water containing BOD sources and nitrogen sources such as ammonia nitrogen, nitrous nitrogen and nitric nitrogen, BOD sources are first decomposed by BOD oxidizing bacteria in an aeration tank, the liquid is treated in a nitrifying tank where large quantities of nitrifying bacteria are present to oxidize ammonia nitrogen to nitrous acid or nitric acid, and the treated liquid is anaerobically treated in a denitrifying tank to reduce nitrous acid or nitric acid to molecular nitrogen by denitrifying bacteria in the presence of a hydrogen donor such as methanol or acetic acid.

In this method, it is necessary to arrange an aerobic BOD-treating tank, a nitrifying tank and an anaerobic denitrifying tank, and the treatment apparatus is complicated. Furthermore, if the pH value of the liquid in the nitrifying tank is reduced below 6.5 by conversion of ammonia nitrogen to nitrous or nitric nitrogen, the activity of the nitrifying bacteria in the nitrifying tank is drastically reduced. Accordingly, in order to maintain a high efficiency in the treatment, it is preferred that the pH value of the liquid in the nitrifying tank be maintained at 7 to 8. For this purpose, it is necessary to add an alkaline agent to adjust the pH value in the tank. Furthermore, the nitrifying bacteria undergo concentration inhibition by nitrous acid or nitric acid, and therefore, it is not permissible to increase the concentration of nitrous acid or nitric acid in the tank. Accordingly, the concentrations of ammonia nitrogen, nitrous nitrogen and nitric nitrogen to be introduced into the nitrifying tank should be controlled at low levels. For this reason, contaminated water having a high concentration of ammonia nitrogen, such as urine or waste water from a swinery, should be diluted to reduce the concentration of nitrous acid or nitric acid to be formed and a large quantity of water should be used for dilution.

In the denitrifying tank, nitrous acid or nitric acid is reduced to molecular nitrogen by the action of denitrifying bacteria. To realize this conversion, an expensive hydrogen donor such as methanol or acetic acid must be added in an amount about 3 times the theoretical amount.

As is seen from the foregoing description, the conventional method is defective in various ways. The treatment equipment is complicated increasing the manufacturing cost of the equipment, large quantities of an alkaline agent and an expensive hudrogen donor have to be used, and furthermore, for contaminated water containing high concentrations of ammonia nitrogen, nitrous nitrogen and nitric nitrogen, a large quantity of water must be used for dilution.

A method and apparatus for purifying water containing organic pollutants using a membrane of hollow fiber has been proposed, in which oxygen is supplied through the hollow fibers of the membrane to grow aerobic microorganisms on the membrane and polluted water is purified by the microorganisms (U.S. Pat. No. 4,181,604). In this previous proposal, there are specifically employed aerobic microorganisms, and BOD and COD (Chemical Oxygen Demand) in polluted water are removed by BOD-oxidizing bacteria. However, this previous disclosure does not include a method of oxidizing nitrogen compounds such as ammonia, formed by the action of the BOD-oxidizing bacteria, by nitrifying bacteria and reducing formed nitrous acid or nitric acid to harmless nitrogen products by denitrifying bacteria.

SUMMARY OF THE INVENTION

It has been found that in purifying contaminated water by microorganisms propagated on a membrane, not only BOD-oxidizing bacteria but also nitrifying and denitrifying bacteria can be present in a microorganism layer formed on the support. Not only aerobic portions but also anaerobic portions are inevitably present in such a microorganism layer. Propagation of nitrifying bacteria is promoted in a very aerobic atmosphere with high activity. The speed of reduction of nitrous acid or nitric acid by denitrying bacteria is much higher than the speed of formation of nitrous acid or nitric acid by nitrifying bacteria. A superior purifying method has been based on these discoveries which is the present invention.

More specifically, according to the present invention, the aerobic portions of the microorganism layer formed and deposited on the support are rendered more aerobic to thereby promote oxidation of BOD sources and subsequent oxidation of ammoniacal nitrogen to nitrous acid or nitric acid, whereby the entire treatment inclusive of the denitrifying reaction in the anaerobic portions is promoted and decomposition of the BOD sources and nitrification and denitrification of the nitrogen sources are simultaneously performed at a high efficiency.

According to the invention there is provided a process for purifying contaminated water containing BOD sources and nitrogen sources, which comprises using a gas-permeable membrane as a support for a microorganism layer, supplying oxygen or oxygen-containing gas from one side of the membrane to the microorganism layer formed on the other side of the membrane (which is in contacat with contaminated water) characterized in that aerobic bacteria and anaerobic bacteria are co-present in the microorganism layer, and thereby performing removal of the BOD sources in the contaminated water and removal of the nitrogen sources by nitrification and denitrification simultaneously.

It has been found that in order to perform the foregoing treatment at a high efficiency, it is sufficient to use a gas-permeable membrane as the microorganism layer-carrying support and sufficiently supply of oxygen from the side of the membrane opposite to the side where the microorganism layer is formed. It has also been found that a membrane formed of porous hollow fibers is especially preferred as the membrane. Furthermore, it has been found that the process of the present invention is especially effective if the concentration of dissolved oxygen in contaminated water is maintained at 1 to 7 ppm or the ratio of the BOD sources to the nitrogen sources (BOD/N ratio) in contaminated water is at least 0.5.

DETAILED DESCRIPTION OF THE PREFERRED EMBODIMENTS

If oxygen or oxygen-containing gas is passed from the interior of a microorganism layer-carrying support, when the gas passes through the microorganism layer, agitation of the liquid is caused in the interior of the microorganism layer, whereby the contact between the microorganism and liquid and the contact between the liquid and gas are enhanced and the efficiency of utilization of oxygen is increased. Accordingly, the microorganisms present in the portion through which the gas passes are kept in a very aerobic atmosphere, and BOD-oxidizing bacteria and nitrifying bacteria among the microorganisms present in this portion are highly activated. Therefore, BOD sources are oxidized and subsequently, ammonia nitrogen is oxidized, and nitrous acid or nitric acid is very readily formed.

On the other hand, also the anerobic portion is present throughout the interior of the microorganism layer, though the proportion of this portion is small. If the liquid containing nitrous acid or nitric acid is brought into contact with this anerobic portion, nitrous acid or nitric acid is promptly reduced to molecular nitrogen by the action of denitrifying bacteria while using the present BOD source as the hydrogen donor.

As is seen from the foregoing description, both the aerobic portions and the anaerobic portions are co-present in the microorganism layer and the liquid is moved alternately between the aerobic and anaerobic portions. Thus, the aerobic treatment and anaerobic treatment are repeated a number of times. It is considered that for this reason, the overall treatment operates at a high efficiency.

More specifically, the process of the present invention for purifying contaminated water containing BOD sources and nitrogen sources is characterized in that a gas-permeable membrane is used as the support for a microorganism layer, oxygen or oxygen-containing gas is supplied from one side of the membrane (the side not in contact with contaminated water) to aerate the microorganism layer formed on the other side (the side in contact with contaminated water) of the membrane through the membrane, and both the aerobic bacteria and anaerobic bacteria are co-present in the microorganism layer to simultaneously accomplish removal of the BOD sources in contaminated water and nitrification and denitrification for removal of the nitrogen sources.

A membrane having a high gas permeability and a hydrophobic property is preferred as the gas-permeable membrane used in the present invention.

As such membrane, there can be mentioned a thin membrane composed of a silicone resin and a reverse osmosis membrane or ultra-filtration membrane having a porous structure.

A membrane having a flat film-like shape or a tube-like shape may be used in the present invention. However, a hollow yarn membrane is especially preferred in the present invention because the surface area of the adhering microorganism layer is increased.

Such hollow yarn membrane is ordinarily prepared by forming a spinnable polymer, such as a halogenated polyolefin, a polyolefin, a polyacrylonitrile, a polyester or a polyamide, into a hollow yarn membrane and rendering it porous.

Hydrophobic polymeric materials, for example, halogenated polyolefins such as polytetrafluoroethylene and polyvinylidene fluoride and polyolefins such as polypropylene and polyethylene are especially preferred.

When a hollow yarn membrane having an outer diameter of 0.01 to 3 mm, preferably 0.05 to 1 mm, and an air permeability of 10 to $3 \times 10^5$ l/m$^2$.hr.atm in the dry state is used, the intended objects of the present invention can be attained very effectively.

It is preferred that fine pores in the wall of the hollow yarn membrane should have such a size as not to allow intrusion of microorganisms in water into the interior of the membrane. More specifically, it is preferred that the average pore size be less than 0.5 $\mu$m.

Various advantages can be achieved using these hollow yarn membranes as the microorganism layer-carrying support and means for supplying oxygen or oxygen-containing gas. For example, the microorganism layer-supporting area per unit area can be increased and the microorganism layer is uniformly distributed in the membrane. Accordingly, large quantities of microorganisms can be supported uniformly and the efficiency of contact between the liquid and microorganism layer is enhanced. Furthermore, since oxygen or oxygen-containing gas is uniformly supplied from the interior of the supporting membrane, very good aerobic atmospheres can be produced in the microorganism layer-adhering portions of the supporting membrane and the gas-passing portions in the microorganism layer, and such gas-passing portions can be present throughout the microorganism layer. Furthermore, agitation of the liquid by the gas is caused when the gas passes through the interior of the microorganism layer, and in the portion where this agitation occurs, the efficiency of the contact of the liquid with the microorganisms is enhanced. In the exterior zone of the microorganism layer, the liquid in the tank is stirred by the gas which has passed through the microorganism layer and the mingling state of the liquid is improved. Moreover, clogging of the supporting membrane with the microorganisms hardly takes place and stable aeration can be obtained. For these reasons, the treatment efficiency is considerably enhanced.

By the term "oxygen-containing gas" used herein is meant air or oxygen-rich air, and aeration is accomplished by feeding such gas under pressure. The gas supply rate may be adjusted by appropriately changing the pressure to be applied to the interior of the hollow yarn membrane. It is important, however, in the present invention that the gas should be supplied so that the concentration of dissolved oxygen in the liquid to be brought into contact with the microorganism layer is 1 to 7 ppm, preferably 2 to 5 ppm. If the concentration of dissolved oxygen is outside this range, removal of BOD sources and nitrification and denitrification may not be simultaneously obtained.

By the term "water containing BOD sources and nitrogen sources" used herein is meant water containing, dissolved therein, substances that can be biochemically oxidized and nitrogen of various states such as organic nitrogen, ammonia nitrogen, nitric nitrogen and nitrous nitrogen. The concentrations of BOD sources and nitrogen sources are not particularly critical. However, it is preferred that the concentration of the BOD sources be higher than the critical evel necessary for reducing nitrous acid or nitric acid. Accordingly, when the BOD concentration is lower than this critical level, it is preferred that additional BOD sources be incorporated into water to be treated. Preferred amounts of the BOD sources are such that the ratio of the weight of the BOD sources to the weight of the nitrogen sources (BOD/N) is at least 0.5, especially at least 1.5. If this ratio is lower than 0.5, nitrification and denitrification of the nitrogen sources cannot be performed effectively.

In the process of the present invention, in order to purify contaminated water, it is necessary to form a microorganism layer on the hollow yarn membrane. This is ordinarily accomplished by continuing for about 1 month the operation of circulating water to be treated into the treatment tank, adding nutrient salts to water if necessary and supplying oxygen or oxygen-containing gas through the interior of the hollow yarn membrane. In this case, it is preferred that a seed sludge containing nitrifying bacteria and denitrifying bacteria is added to the water so that the microorganism layer is formed in a shorter period. The so-formed microorganism layer is stable against a high load and an abrupt change of the load. If the microorganism layer grows beyond a certain level, the topmost layer portion of the microorganism layer is exfoliated in the form of a sludge mass. This exfoliated sludge mass has a good precipitating property, and therefore, it can easily be separated.

The apparatus disclosed in the specification of U.S. Pat. No. 4,181,604 can be used for carrying out the process of the present invention. More specifically, contaminated water is introduced into a treatment tank packed with a bundle of hollow yarn membranes having the end portion connected to a gas supply source and contaminated water is brought into contact with microorganism layers adhering to the outer surfaces of the hollow yarn membranes to effect purification. In this case, there may be adopted either a so-called dipping method in which the hollow yarn membrane bundle is completely immersed in the liquid, or a flowing method in which contaminated water flows down on the surfaces of the hollow yarn membranes. Furthermore, a part of treated water may be returned to the inlet of the treatment tank. Moreover, there may be adopted a multi-stage method in which a plurality of treatment tanks are arranged in series and contaminated water is treated in these tanks in sequence. Still further, the treatment process of the present invention may be connected to other physical or chemical treatment process.

As will be apparent from the foregoing description, since removal of the BOD sources and removal of the nitrogen sources by nitrification and denitrification can be performed simultaneously at a high efficiency only by controlling the gas supply rate in an aeration tank, the structure of the treatment apparatus can be much simplified and the size thereof can be diminished. Since nitrous acid or nitric acid formed is promptly reduced in anaerobic portions in the microorganism layer, control of the pH value in the liquid of the tank by addition of an alkaline agent need not be performed. Moreover, since the BOD sources are used as the hydrogen donor necessary for reduction of nitrous acid or nitric acid, the process of the present invention is very advantageous from the industrial viewpoint. Furthermore, the apparatus can be operated very easily and maintenance and control of the apparatus can be facilitated remarkably.

The present invention will now be described, in detail with reference to the following Examples that by no means limit the scope of the invention.

EXAMPLE 1

A tank having a length of 0.1 m, a width of 0.1 m and a depth of 0.7 m, which was provided with a water inlet in the upper portion and a water outlet in the lower portion, was used as a treatment apparatus, and 1600 of polypropylene hollow yarns having a length of 1 m, an outer diameter of 275 $\mu$m and an inner diameter of 220 $\mu$m were divided into 4 groups (each consisting of 400 hollow yarns), the yarns of the respective groups were bundled into loops and the bent portions of the so-formed 4 loops were secured to the upper portion of the tank, while the lower open ends of the loops were connected to 4 air supply pipes, respectively. The average pore size of fine pores present on the wall of this polypropylene hollow yarn membrane was 0.1 $\mu$m as measured through an electron microscope. It was found that the air permeation rate of the hollow yarn membrane was $1.3 \times 10^5$ $1/m^2.hr.atm$ in the dry state.

After the bundles of the hollow yarn membranes had been immersed in water, air was supplied under a pressure of 0.2 $Kg/cm^2$ gauge, and contaminated water containing BOD sources and nitrogen sources was treated while the majority of water flowing out from the outlet was returned to the inlet. The air supply rate was 45 l/hr, and the ratio of the quantity of returned water to the quantity of treated water withdrawn was 50. Synthetic waste water containing peptone, meat extract, ammonia etc. was used as the starting contaminated water. The BOD/N ratio in the starting contaminated water was 3.7. The treatment was conducted continuously for a residence time of 5 days. The treatment results are shown in Table 1. The concentration of dissolved oxygen in the liquid was 2.5 ppm. As is seen from the results shown in Table 1, the treatment could be conducted at a high efficiency even if the concentrations of the BOD and nitrogen sources were high.

TABLE I

| | TREATMENT RESULTS | | |
|---|---|---|---|
| ITEM | STARTING WATER | TREATED WATER | TREATMENT EFFICIENCY |
| BOD | 10656 ppm | 53 ppm | 99.5% |
| Organic nitrogen | 1570 ppm | 39 ppm | — |
| Ammonia nitrogen | 1309 ppm | 87 ppm | — |
| Nitric nitrogen | 0 ppm | 35 ppm | — |
| Nitrous nitrogen | 0 ppm | 2 ppm | — |
| Total nitrogen* | 2879 ppm | 163 ppm | 94.3% |
| pH | 8.17 | 7.60 | — |

Note
*total nitrogen = organic nitrogen + ammonia nitrogen nitrous nitrogen + nitric nitrogen

EXAMPLE 2

The same treatment apparatus as used in Example 1 was used, and synthetic waste water (BOD/N=1.9) containing peptone, meat extract, urea, ammonia and nitric acid was used as the starting contaminated water. The treatment was conducted in a continuous manner at an air supply rate of 45 l/hr for a residence time of 30 hours. The ratio of the quantity of returned water to the quantity of treated water withdrawn was 14. The treatment results are shown in Table 2. The concentration of dissolved oxygen in the liquid was 4 ppm.

TABLE 2

| ITEM | TREATMENT RESULTS | | |
|---|---|---|---|
| | STARTING WATER | TREATED WATER | TREATMENT EFFICIENCY |
| BOD | 1865 ppm | 19 ppm | 99.0% |
| Organic nitrogen | 743 ppm | 10 ppm | — |
| Ammonia nitrogen | 90 ppm | 36 ppm | — |
| Nitric nitrogen | 147 ppm | 0 ppm | — |
| Nitrous nitrogen | 0 ppm | 30 ppm | — |
| Total nitrogen | 980 ppm | 76 ppm | 92.2% |
| pH | 3.00 | 7.26 | — |

EXAMPLE 3

The same treatment apparatus as used in Example 1 was used, and synthetic waste water (BOD/N=2.8) containing peptone, meat extract, ammonia, etc. was used as the starting contaminated water. The treatment was conducted in a continuous manner at an air supply rate of 47 l/hr for a residence time of 30 hours. The ratio of the quantity of returned water to the quantity of treated water withdrawn was 14. The treatment results are shown in Table 3. The concentration of dissolved oxygen in the liquid was 3.5 ppm.

TABLE 3

| ITEM | TREATMENT RESULTS | | |
|---|---|---|---|
| | STARTING WATER | TREATED WATER | TREATMENT EFFICIENCY |
| BOD | 1732 ppm | 45 ppm | 97.4% |
| Organic nitrogen | 128 ppm | 27 ppm | — |
| Ammonia nitrogen | 488 ppm | 51 ppm | — |
| Nitric nitrogen | 0 ppm | 0 ppm | — |
| Nitrous nitrogen | 0 ppm | 0 ppm | — |
| Total nitrogen | 616 ppm | 78 ppm | 87.3% |
| pH | 7.62 | 7.51 | — |

EXAMPLE 4

The treatment was conducted in a continuous manner at an air supply rate of 45 l/hr for a residence time of 56 hours by using the same apparatus and substantially the same starting water as used in Example 3. The ratio of the quantity of returned water to the quantity of treated water withdrawn was 14. The treatment results are shown in Table 4. The concentration of dissolved oxygen in the liquid was 6.5 ppm.

TABLE 4

| ITEM | TREATMENT RESULTS | | |
|---|---|---|---|
| | STARTING WATER | TREATED WATER | TREATMENT EFFICIENCY |
| BOD | 1700 ppm | 5 ppm | 99.7% |
| Organic nitrogen | 141 ppm | 1 ppm | — |
| Ammonia nitrogen | 486 ppm | 146 ppm | — |
| Nitric nitrogen | 0 ppm | 187 ppm | — |
| Nitrous nitrogen | 0 ppm | 0 ppm | — |
| Total nitrogen | 627 ppm | 333 ppm | 46.9% |
| pH | 7.31 | 6.55 | — |

COMPARATIVE EXAMPLE

The treatment was conducted in a continuous manner at an air supply rate of 20 l/hr for a residence time of 20 hours by using the same treatment apparatus and the substantially same starting water as used in Example 3. The ratio of the quantity of returned water to the quantity of treated water withdrawn was 14. The treatment results are shown in Table 5. The concentration of dissolved oxygen in the liquid was 0.7 ppm.

TABLE 5

| ITEM | TREATMENT RESULTS | | |
|---|---|---|---|
| | STARTING WATER | TREATED WATER | TREATMENT EFFICIENCY |
| BOD | 1690 ppm | 152 ppm | 91.0% |
| Organic nitrogen | 128 ppm | 28 ppm | — |
| Ammonia nitrogen | 472 ppm | 412 ppm | — |
| Nitric nitrogen | 0 ppm | 0 ppm | — |
| Nitrous nitrogen | 0 ppm | 0 ppm | — |
| Total nitrogen | 600 ppm | 440 ppm | 26.7% |
| pH | 7.56 | 8.07 | — |

EXAMPLE 5

The treatment was conducted in a continuous manner at an air supply rate of 47 l/hr for a residence time of 30 hours by using the same treatment apparatus as used in Example 1 and starting water (BOD/N=0.5) having a total nitrogen concentration higher than that of the starting water used in Example 3. The ratio of the quantity of returned water to the quantity of treated water withdrawn was 14. The treatment results are shown in Table 5A. The concentration of dissolved oxygen in the liquid was 2.5 ppm.

TABLE 5

| ITEM | TREATMENT RESULTS | | |
|---|---|---|---|
| | STARTING WATER | TREATED WATER | TREATMENT EFFICIENCY |
| BOD | 1750 ppm | 7 ppm | 99.6% |
| Organic nitrogen | 2032 ppm | 21 ppm | — |
| Ammonia nitrogen | 1480 ppm | 481 ppm | — |
| Nitric nitrogen | 0 ppm | 1233 ppm | — |
| Nitrous nitrogen | 0 ppm | 260 ppm | — |
| Total nitrogen | 3512 ppm | 1995 ppm | 43.2% |
| pH | 7.6 | 6.1 | — |

EXAMPLE 6

The continuous treatment was carried out by using the same treatment apparatus as used in Example 1 under the same conditions as adopted in Example 5 except that starting water (BOD/N=2.0) having a total nitrogen concentration lower than that of the starting water used in Example 3 was used. The treatment results are shown in Table 6. The concentration of dissolved oxygen in the liquid was 4.5 ppm.

TABLE 6

| ITEM | TREATMENT RESULTS | | |
|---|---|---|---|
| | STARTING WATER | TREATED WATER | TREATMENT EFFICIENCY |
| BOD | 1705 ppm | 10 ppm | 99.4% |
| Organic nitrogen | 55 ppm | 1 ppm | — |
| Ammonia nitrogen | 30 ppm | 34 ppm | — |
| Nitric nitrogen | 0 ppm | 0 ppm | — |
| Nitrous nitrogen | 0 ppm | 0 ppm | — |
| Total nitrogen | 85 ppm | 35 ppm | 58.8% |
| pH | 7.6 | 7.7 | — |

We claim:

1. A process for purifying contaminated water containing biochemical oxygen demand sources and nitrogen sources, which comprises establishing both aerobic bacteria and anaerobic bacteria in a microorganism layer on one side of a gas permeable membrane, supplying oxygen-containing gas to one side of said gas permeable membrane in sufficient pressure to pass through the membrane and the microorganism layer on the other side of the membrane, and contacting contaminated liquid with the microorganism layer, the concentration of oxygen dissolved in the liquid being from 1 to 7 ppm, thereby to remove at a high efficiency biochemical oxygen demand sources and nitrogen sources in the contaminated water simultaneously.

2. A purifying process according to claim 1, wherein the gas permeable membrane is composed of hollow fibers having an outer diameter of 0.01 to 3 mm.

3. A purifying process according to claim 2, wherein the hollow fiber membrane has fine pores having a pore size of less than 0.5 μm on the membrane wall.

4. A purifying process according to claim 1, wherein the weight ratio of biochemical oxygen demand (BOD) to nitrogen (BOD/N) in contaminated water is at least 0.5.

5. A purifying process according to claim 4, wherein the weight ratio of BOD to nitrogen (BOD/N) in contaminated water is at least 1.5.

* * * * *